(12) United States Patent
Liu et al.

(10) Patent No.: US 10,210,483 B2
(45) Date of Patent: Feb. 19, 2019

(54) CREATING RECURRING APPOINTMENTS

(71) Applicant: MICROSOFT TECHNOLOGY LICENSING, LLC, Redmond, WA (US)

(72) Inventors: Jenny Liu, Redmond, WA (US); Jackson Thompson, Seattle, WA (US); Protik Hossain, Redmond, WA (US); Choon-mun Hooi, Seattle, WA (US); Brian Tsang, Redmond, WA (US); Jonathan Cadiz, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1064 days.

(21) Appl. No.: 13/914,506

(22) Filed: Jun. 10, 2013

(65) Prior Publication Data
US 2014/0365261 A1     Dec. 11, 2014

(51) Int. Cl.
*G06Q 10/00*     (2012.01)
*G06Q 10/10*     (2012.01)
*H04L 12/58*     (2006.01)
*G06Q 10/06*     (2012.01)

(52) U.S. Cl.
CPC . *G06Q 10/1095* (2013.01); *G06Q 10/063116* (2013.01); *H04L 51/046* (2013.01); *Y10S 707/99931* (2013.01); *Y10S 715/963* (2013.01)

(58) Field of Classification Search
None
See application file for complete search history.

(56) References Cited

U.S. PATENT DOCUMENTS

| | | | |
|---|---|---|---|
| 6,249,765 B1 * | 6/2001 | Adler | G10L 15/04 379/88.03 |
| 6,675,356 B1 * | 1/2004 | Adler | G06Q 10/109 707/999.001 |
| 7,349,920 B1 * | 3/2008 | Feinberg | G06Q 10/109 |
| 7,693,736 B1 | 4/2010 | Chu et al. | |

(Continued)

OTHER PUBLICATIONS

"Irregular Recurring Appointments and Meetings", Published on: Jul. 7, 2011, Available at: http://www.msoutlook.info/question/549

(Continued)

*Primary Examiner* — Gurkanwaljit Singh
(74) *Attorney, Agent, or Firm* — Merchant & Gould

(57) ABSTRACT

A user creates appointments by selecting dates on a displayed calendar. A pattern may be automatically detected in response to the user selecting calendar dates on the calendar. For example, a pattern may automatically be detected when a user selects two Mondays in a row when selecting appointment dates. In response to automatically detecting a pattern, a list of recurring appointments is automatically created. The automatically created appointments may be shown on the calendar. The automatically created appointments may also be shown in a list of an appointment user interface. A user may interact with the appointments in the appointment user interface. For example, a user may select one of the displayed appointments from the list and change appointment information related to the selected appointment. A start date and an end date may also be specified using the appointment user interface.

20 Claims, 13 Drawing Sheets

(56) References Cited

U.S. PATENT DOCUMENTS

| | | | | |
|---|---|---|---|---|
| 8,073,725 | B2* | 12/2011 | Loring | G06Q 10/107 705/7.18 |
| 8,635,533 | B2* | 1/2014 | Zinn | G06Q 10/109 715/733 |
| 2005/0222971 | A1* | 10/2005 | Cary | G06Q 10/109 |
| 2006/0095859 | A1* | 5/2006 | Bocking | G06Q 10/109 715/764 |
| 2006/0265263 | A1 | 11/2006 | Burns | |
| 2008/0195455 | A1* | 8/2008 | May | G06F 15/02 705/7.18 |
| 2009/0299807 | A1 | 12/2009 | Schiller et al. | |
| 2009/0307043 | A1 | 12/2009 | Cholewinski | |
| 2010/0153162 | A1* | 6/2010 | Tam | G06Q 10/02 705/7.19 |
| 2010/0191566 | A1* | 7/2010 | Loring | G06Q 10/107 705/7.19 |
| 2011/0054976 | A1 | 3/2011 | Adler et al. | |
| 2011/0125545 | A1* | 5/2011 | Lehmann | G06Q 10/06314 705/7.24 |
| 2011/0153629 | A1* | 6/2011 | Lehmann | G06Q 10/06 707/758 |
| 2012/0030194 | A1 | 2/2012 | Jain | |
| 2013/0010575 | A1* | 1/2013 | He | G06Q 10/109 368/10 |
| 2013/0290058 | A1* | 10/2013 | Gray | G06Q 10/1095 705/7.19 |
| 2014/0229560 | A1* | 8/2014 | Gray | G06Q 10/1095 709/206 |
| 2014/0365107 | A1* | 12/2014 | Dutta | G01C 21/343 701/408 |

OTHER PUBLICATIONS

Muller, Mark, "Creating Repeat Appointments and Events with Google Calendar", Published on: Jul. 27, 2008, Available at: http://www.brighthub.com/internet/google/articles/2164.aspx.

"Quick Start Guide", Published on: Jun. 19, 2010, at: Available http://www.zoho.com/calendar/help/guick-start-guide.html.

"Creating Recurring Appointments", Published on: May 25, 2012, Available at: http://www.zimbra.com/desktop/help/en_US/Calendar/Creating_recurring_appointments.htm.

Bederson, et al., "DateLens: A Fisheye Calendar Interface for PDAs", In ACM Transactions on Computer-Human Interaction, vol. 11, Issue 1, Mar. 2004, 30 pages.

"International Search Report and Written Opinion Issued in PCT Application No. PCT/US2014/040185", dated Mar. 10, 2015, 7 Pages.

European Extended Search Report in 14733893.3, dated Nov. 3, 2016, 5 pages.

"Office Action Issued in European Patent Application No. 14733893.3", dated Mar. 20, 2017, 6 Pages.

PCT International Preliminary Report on Patentability in International Application PCT/US2014/040185, dated Dec. 15, 2015, 5 pgs.

* cited by examiner

April 2013 ~210

| Monday | Tuesday | Wednesday | Thursday | Friday | Saturday | Sunday |
|---|---|---|---|---|---|---|
| 31 | 1<br>3PM<br>Enter Text | 2 | 3 | 4 | 5 | 6 |
| 7 | 8<br>3PM<br>Enter Text | 9 | 10 | 11 | 12 | 13 |
| 14 | 15<br>3PM<br>Enter Text | 16  220 | 17 | 18 | 19 | 20 |
| 21 | 22<br>3PM<br>Enter Text | 23 | 24 | 25 | 26 | 27 |
| 28 | 29<br>3PM<br>Enter Text | 30 | 1 | 2 | 3 | 4 |

April 2013 ~250

| Monday | Tuesday | Wednesday | Thursday |
|---|---|---|---|
| 31 | 1<br>3PM<br>Enter Text | 2 | 3 |
| 7 | 8<br>3PM<br>Enter Text | 9 | 10 |
| 14 | 15<br>3PM<br>Enter Text | 16 | 17 |
| 21 | 22<br>3PM<br>Enter Text | 23 | 24 |
| 28 | 29<br>3PM<br>Enter Text | 30 | 1 |

RECURRING APPOINTMENTS

Starts  April 1      3:00PM     ~252
         April 8      3:00PM
        ┌─────────────────────┐
        │ April 15    3:00PM  │
        └─────────────────────┘  260
         April 22     3:00PM
             •
             •
             •

Ends: [          ]  254

[Select Date]

[Save] [Cancel]

FIG.2

April 2013 — 310

| | Sunday | Monday | Tuesday | Wednesday | Thursday | Friday | Saturday |
|---|---|---|---|---|---|---|---|
| | 31 | 1<br>2PM<br>Enter Text | 2 | 3<br>2PM<br>Enter Text | 4 | 5 | 6 |
| | 7 | 8 | 9 | 10 | 11 | 12 | 13 |
| | 14 | 15<br>2PM<br>Enter Text | 16 | 17 | 18 | 19 | 20 |
| | 21 | 22 | 23 | 24 | 25 | 26 | 27 |
| | 28 | 29<br>2PM<br>Enter Text | 30 | 1<br>2PM<br>Enter Text | 2 | 3 | 4 |

— 160

— 350

RECURRING APPOINTMENTS

Starts  April 1    2:00PM

April 3    2:00PM

April 15   2:00PM

April 29   2:00PM

May 1     2:00PM

May 13    2:00PM

⋮

Ends: [ ]

[Select End Date]

[Save]  [Cancel]

Mobile Computing Device

CREATING RECURRING APPOINTMENTS

BACKGROUND

Calendar applications are commonly used by users. Calendar applications may include an option to set appointments including recurring appointments. For example, a user may set recurring appointments for weekly classes, weekly status meetings, monthly trips, twice a week piano lessons, and the like. Scheduling recurring appointments can be challenging. For example, a user may first create a single appointment and then select from a variety of different options in order to create a recurring appointment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user creates appointments by selecting dates on a displayed calendar. A pattern may be automatically detected in response to the user selecting calendar dates on the calendar. For example, a pattern may automatically be detected when a user selects two Mondays in a row when selecting appointment dates. In response to automatically detecting a pattern, a list of recurring appointments is automatically created. The automatically created appointments may be shown on the calendar. The automatically created appointments may also be shown in a list of an appointment user interface. A user may interact with the appointments in the appointment user interface. For example, a user may select one of the displayed appointments from the list and change appointment information related to the selected appointment. The user may also delete appointments from the list without having to locate the appointments using the displayed calendar. A start date and an end date may also be specified using the appointment user interface.

BRIEF DESCRIPTION OF THE DRAWINGS

FIG. 2 shows exemplary calendar displays illustrating a user selecting dates to create a recurring appointment;

FIG. 3 illustrates detecting a pattern from selected dates on the calendar;

FIG. 6 illustrates a user selecting dates for appointments from a year calendar view where a pattern is detected;

DETAILED DESCRIPTION

Figure 1:
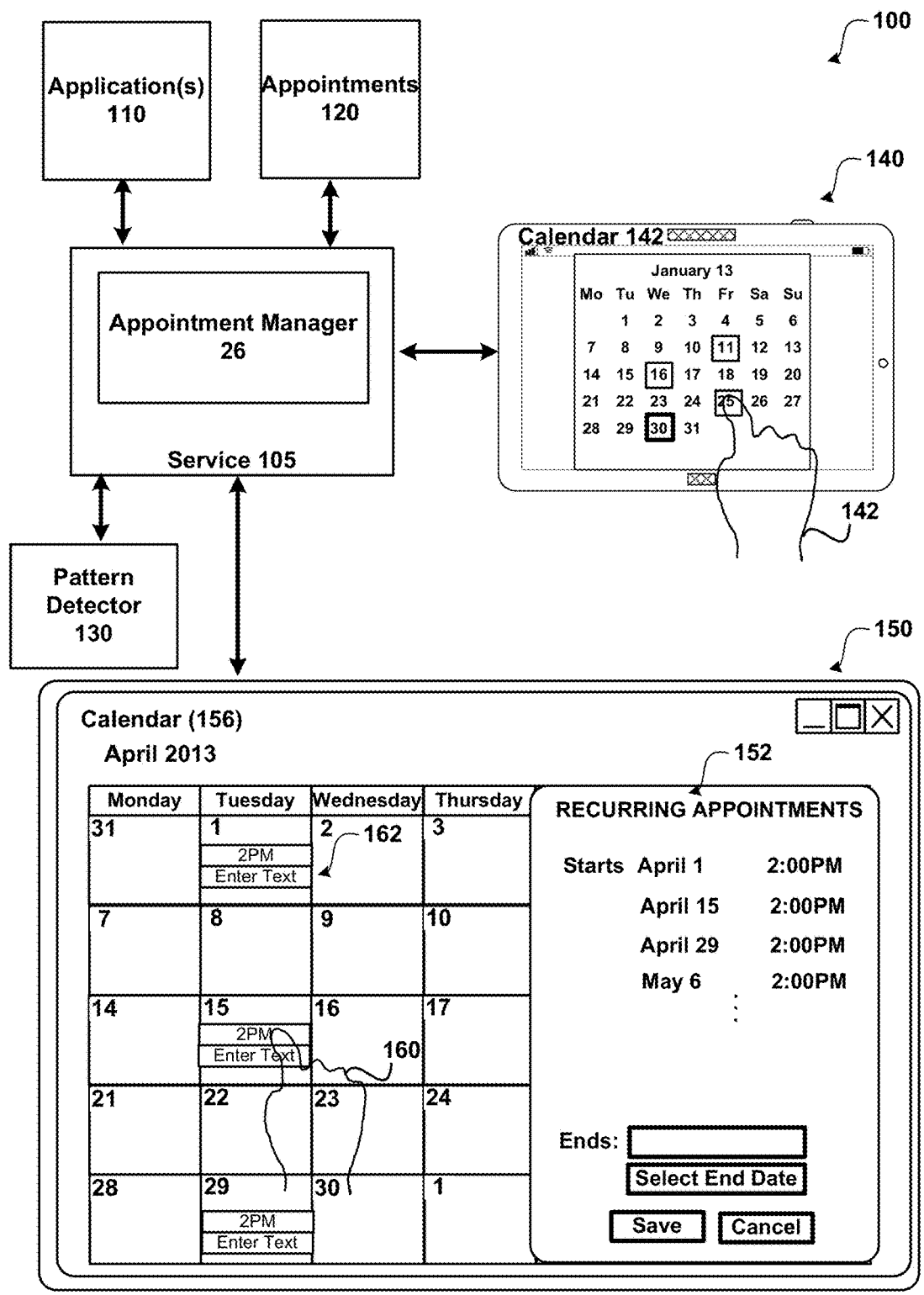
FIG. 1 shows a system for creating appointments.

Referring now to the drawings, in which like numerals represent like elements, various embodiment will be described elements, various embodiment will be described.

FIG. 1 shows a system for creating appointments.

As illustrated, system 100 includes application(s) 110, appointments 120, pattern detector 130, service 105, appointment manager 26, tablet computing device 140, and computing device 150.

Appointment manager 26 is configured to create appointments in response to receiving selections of dates on a displayed calendar. For example, computing device 150 shows a display of calendar 156 in which user 160 is selecting dates on which to create appointments. As illustrated, user 160 has selected April $1^{st}$, April $15^{th}$ and April $29^{th}$ as dates for appointments. According to an embodiment, touch selection is used to select the dates that are displayed on the calendar for which appointments are to be created. Other input methods may be used. For example, a user may use speech input, perform a gesture (e.g. point to a date), and the like.

Instead of having to enter each appointment individually, a user may select appointments directly from the displayed calendar. As the user selects dates on the calendar to create appointments, the appointment is added to a list of appointments by appointment manager 26. According to an embodiment, the list of appointments is displayed in an appointment user interface, such as appointment user interface 152.

The appointments that are selected on the calendar may or may not follow a pattern. Appointment manager 26 uses a pattern detector, such as pattern detector 130, to detect a pattern from the selected dates. Different methods may be used to detect a pattern. When a pattern is detected by pattern detector 130, appointment manager 26 uses the pattern to automatically create additional appointments that follow the pattern. In the example shown on calendar 156, pattern detector 130 detected a pattern that follows a pattern of an appointment every other Tuesday that begins on April $1^{st}$. According to an embodiment, at least two selections are received before attempting to detect a pattern. Other number of selections may be used (e.g. three, four, five, . . . ) before attempting to detect a pattern.

Appointment user interface 152 shows the list of selected appointments and appointments automatically created by appointment manager 26 from a detected pattern. According to an embodiment, each appointment within the appointment user interface 152 is individually selectable and editable. For example, the user may edit appointment information by selecting one of the displayed appointments from the list. The user may also delete dates from the appointment user interface 152 without having to locate the appointment on the display of the calendar. The start date or the end date may be selected from the calendar, selected from a list of possible dates, or entering the date in the appointment user interface 152. A user may also enter appointment information directly from the calendar view. For example, user 160 may select the "Enter Text" option 162 to add appointment information.

Tablet computing device 140 shows a user 142 selecting appointment dates from a calendar. In the current example, the user selected April $11^{th}$, April $16^{th}$ and April $25^{th}$ before appointment manager 26 automatically selected April $30^{th}$ in response to a detected pattern.

In order to facilitate communication with appointment manager 26, one or more callback routines, may be implemented. Application(s) 110 may be a variety of applications, such as personal information management applications, business productivity applications, travel applications, and the like. Generally, application(s) 110 may be any application or service, such as service 105, where a user creates appointments and recurring appointments. The application(s) 110 may be configured to receive different types of input (e.g. speech input, touch input, keyboard input (e.g. a physical keyboard and/or Software Input Panel (SIP)) and/or other types of input.

System 100 as illustrated comprises one or more touch screen input devices, such as tablet computing device 140 and computing device 150, that detects when a touch input has been received (e.g. a finger touching or nearly touching the touch screen). Any type of touch screen may be utilized that detects a user's touch input. More details are provided below.

FIG. 2 shows exemplary calendar displays illustrating a user selecting dates to create a recurring appointment.

Display 210 shows a calendar view for the month of April 2013. Other time periods may be displayed on the calendar. For example, a daily view, a multi-day view, a weekly view, a monthly view, a yearly view, and the like may be displayed. A user may select any day on the calendar to create an appointment. According to an embodiment, a user selects an option (not shown) to enter the appointment mode that receives a selection or selections from the displayed calendar to create an appointment. In the current example, a user has selected April $1^{st}$, April $8^{th}$, and April $15^{th}$ as appointments. The time of the appointment may be set based on a touch location in the day where the appointment is selected or may be set using a different input method (e.g. a user interface option, speech input, . . . ). For example, when the calendar view is a day view, the appointment time may be initially set based on the nearest time increment to the touch location. A user may change the appointment details directly from the display of the calendar or by using a user interface element such as appointment interface 252.

The user may select the dates for appointments in any order (e.g. April $8^{th}$ before April $1^{st}$, . . . ). When a pattern is detected, other appointments are automatically added to the calendar. In the current example, appointments were automatically created for April $22^{nd}$ and April $29^{th}$. According to an embodiment, the appointments that are automatically created are displayed differently from user selected appointments (e.g. different color, highlighting, . . . ).

Appointment user interface 252 shows the list of selected appointments and appointments automatically created from a detected pattern. According to an embodiment, each appointment within the appointment user interface 252 is individually selectable and editable. In the current example, user 260 has selected the April $15^{th}$ appointment for editing. The user may edit the appointment information such as time of the appointment, date of the appointment or other information that is related to the appointment. The user may also delete dates from the appointment user interface 252 without having to first locate the appointment on the display of the calendar. The start and end dates may be selected from the calendar, selected from a list of possible dates, or entering the date in a user interface element 254 that is displayed in the appointment user interface 252.

FIG. 3 illustrates detecting a pattern from selected dates on the calendar.

Display 310 shows a calendar view for the month of April 2013. In the current example, the user has selected appointment dates of April $1^{st}$, April $3^{rd}$, April $15^{th}$, April $29^{th}$ and May 1, 2013. As illustrated in display 310, the selected dates on the calendar do not follow a daily, weekly, monthly or yearly recurrence pattern. A recurrence pattern, however, is automatically detected by the calendar manager. In the current example, the pattern may not be detected until the user has made five appointment selections. In response to detecting the pattern, the appointment user interface 350 is displayed that includes a list of the selected appointments and automatically determined appointments from the pattern.

Figure 4:
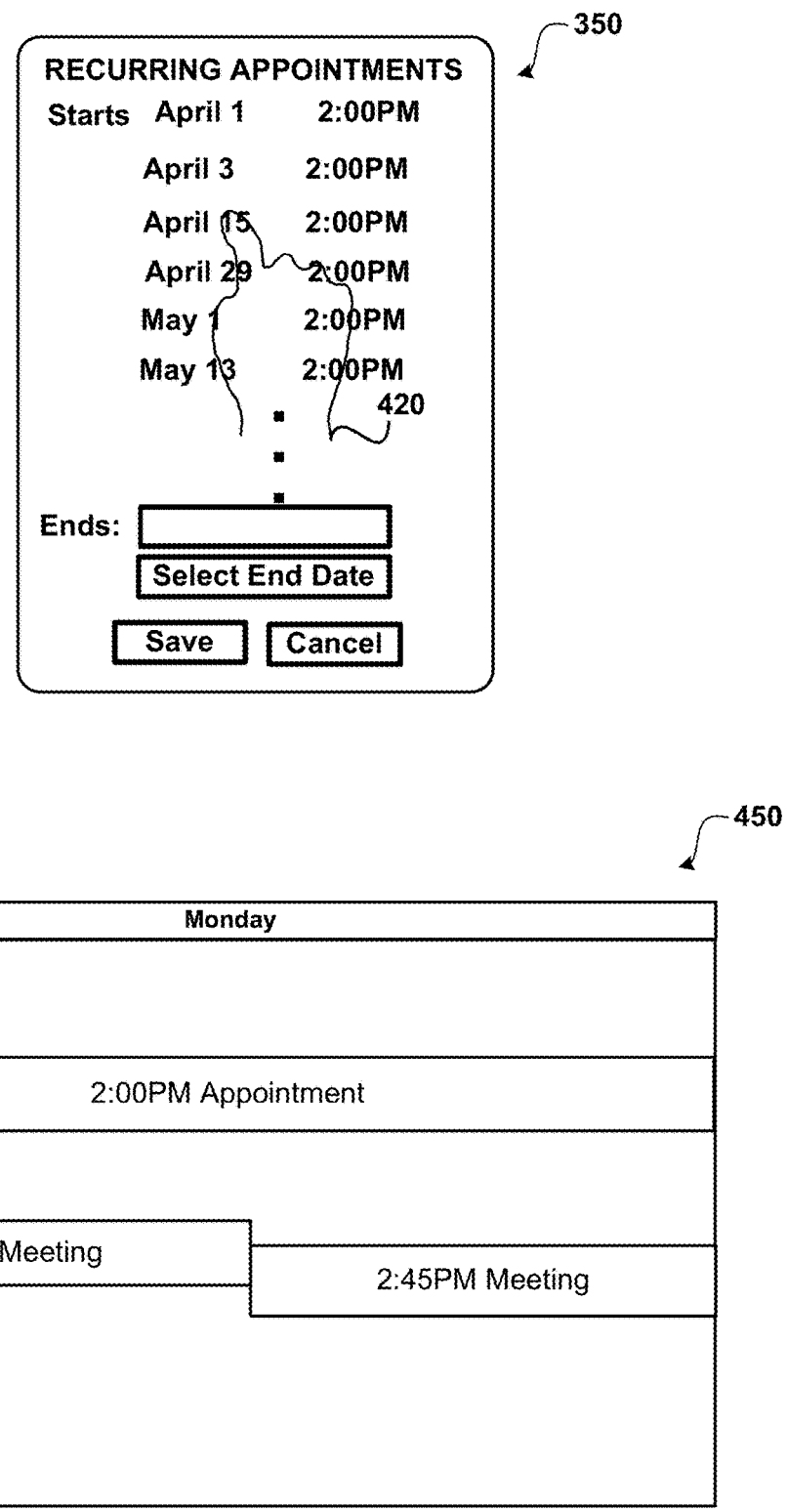
FIG. 4 shows navigating to a day in the calendar in response to a user selecting an appointment from an appointment user interface.

FIG. 4 shows navigating to a day in the calendar in response to a user selecting an appointment from an appointment user interface.

In the current example, user 420 is selecting the April $15^{th}$ appointment from appointment user interface 350. According to an embodiment, when a user selects an appointment from appointment user interface 350, the user is navigated to a display of that day. For example, in response to selecting the April $15^{th}$ appointment, a calendar view for the day of April $15^{th}$ is displayed. The day view may replace the calendar view currently being displayed or be displayed in a different window (e.g. on top of the existing calendar display or at some other location). While a day view is shown, the time period that is displayed may be set to a different time period (e.g. a multi-day view with the selected day centered, a weekly view, and the like). The day view allows a user to see more information for a particular day as compared to a week view or a monthly view.

Figure 5:
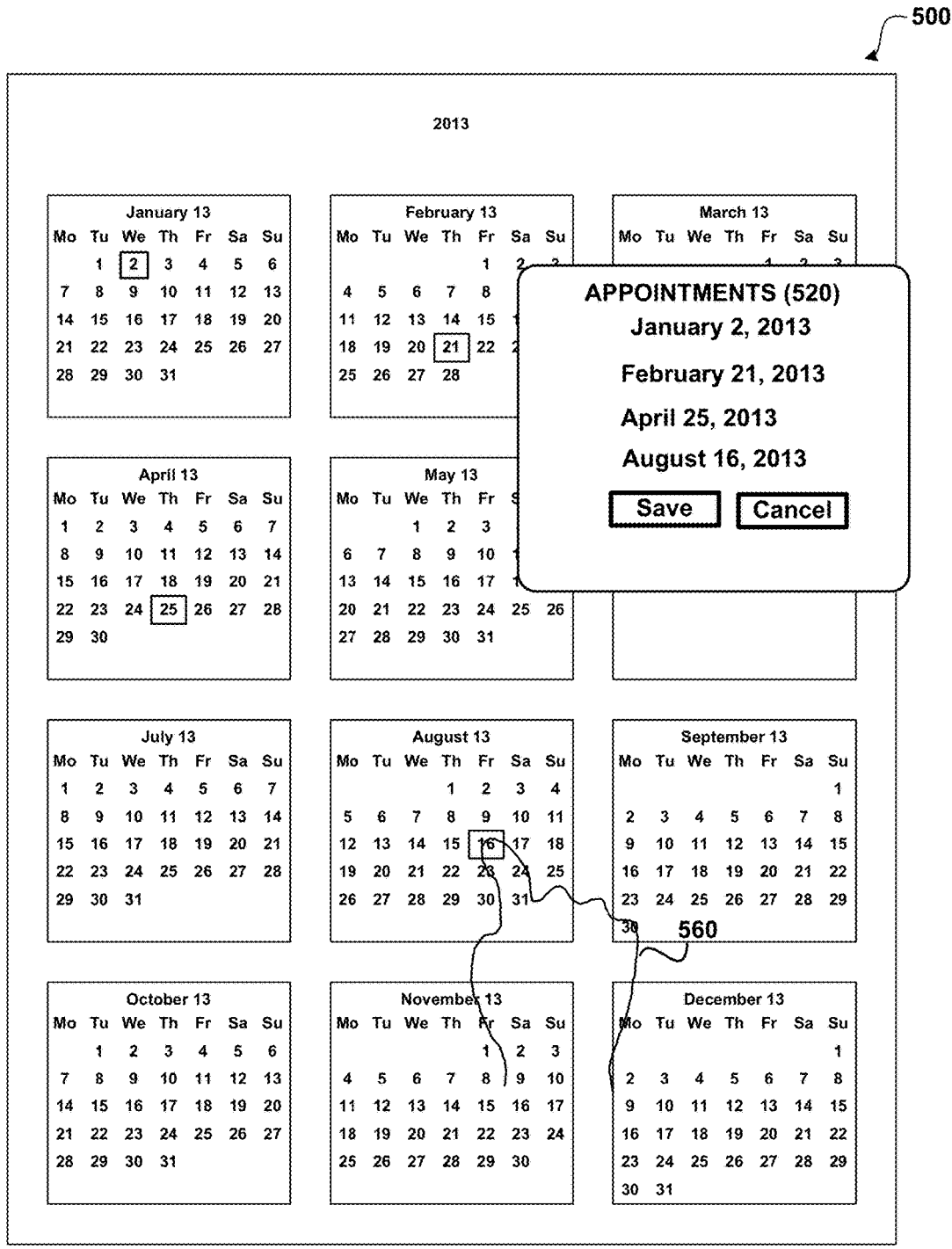
FIG. 5 illustrates a user selecting dates for appointments from a year calendar view where a pattern is not detected.

FIG. 5 illustrates a user selecting dates for appointments from a year calendar view where a pattern is not detected.

Display 500 shows a calendar view for the year of 2013. In the current example, user 560 has selected appointment dates of January $2^{nd}$, February $21^{st}$, April $25^{th}$ and August $16^{th}$ of 2013. In the current example, a pattern has not been detected. In response to the selections of the different dates, appointment user interface 520 may be automatically displayed. According to an embodiment, when a pattern has not been detected, the list of selected days is displayed without including a display of user interface elements relating to recurring appointments. A user may select one of the displayed appointments in appointment user interface 520 to edit the appointment. A user may also save the appointments or cancel (e.g. discard) the appointments.

Figure 6:
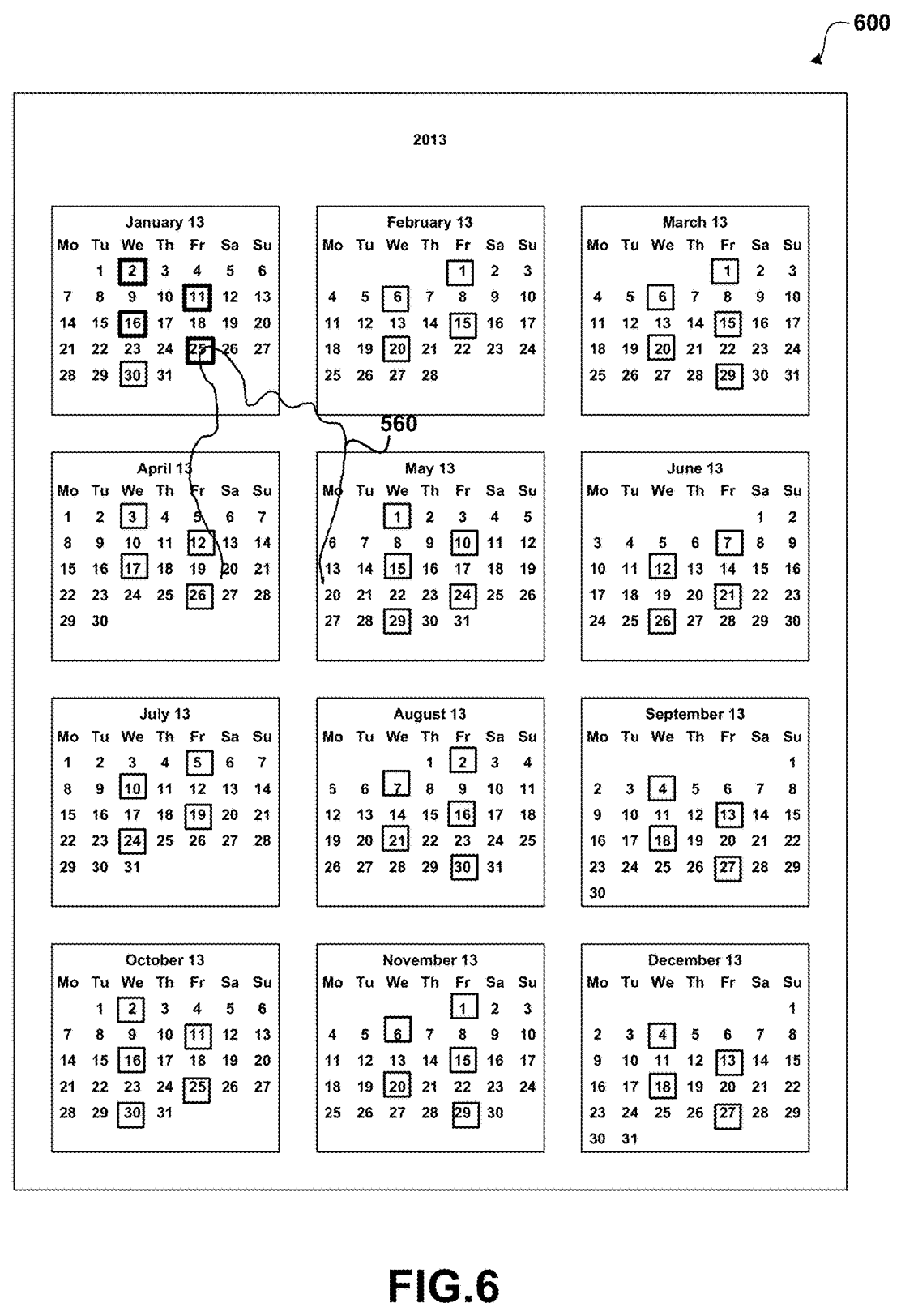

FIG. 6 illustrates a user selecting dates for appointments from a year calendar view where a pattern is detected.

Display 600 shows a calendar view for the year of 2013. In the current example, user 560 has selected appointment dates of January $2^{nd}$, January $11^{th}$, January $16^{th}$, and January $25^{th}$. In the current example, a pattern has been automatically detected. In response to the automatic detection of the pattern of the selected days for appointments, the calendar display 600 is updated to show the automatically created appointments. An appointment user interface, such as appointment user interface 350, may or may not be displayed on the calendar display 600. According to an embodiment, the appointment user interface is automatically displayed. According to another embodiment, the appointment user interface is not automatically displayed.

Figure 7:
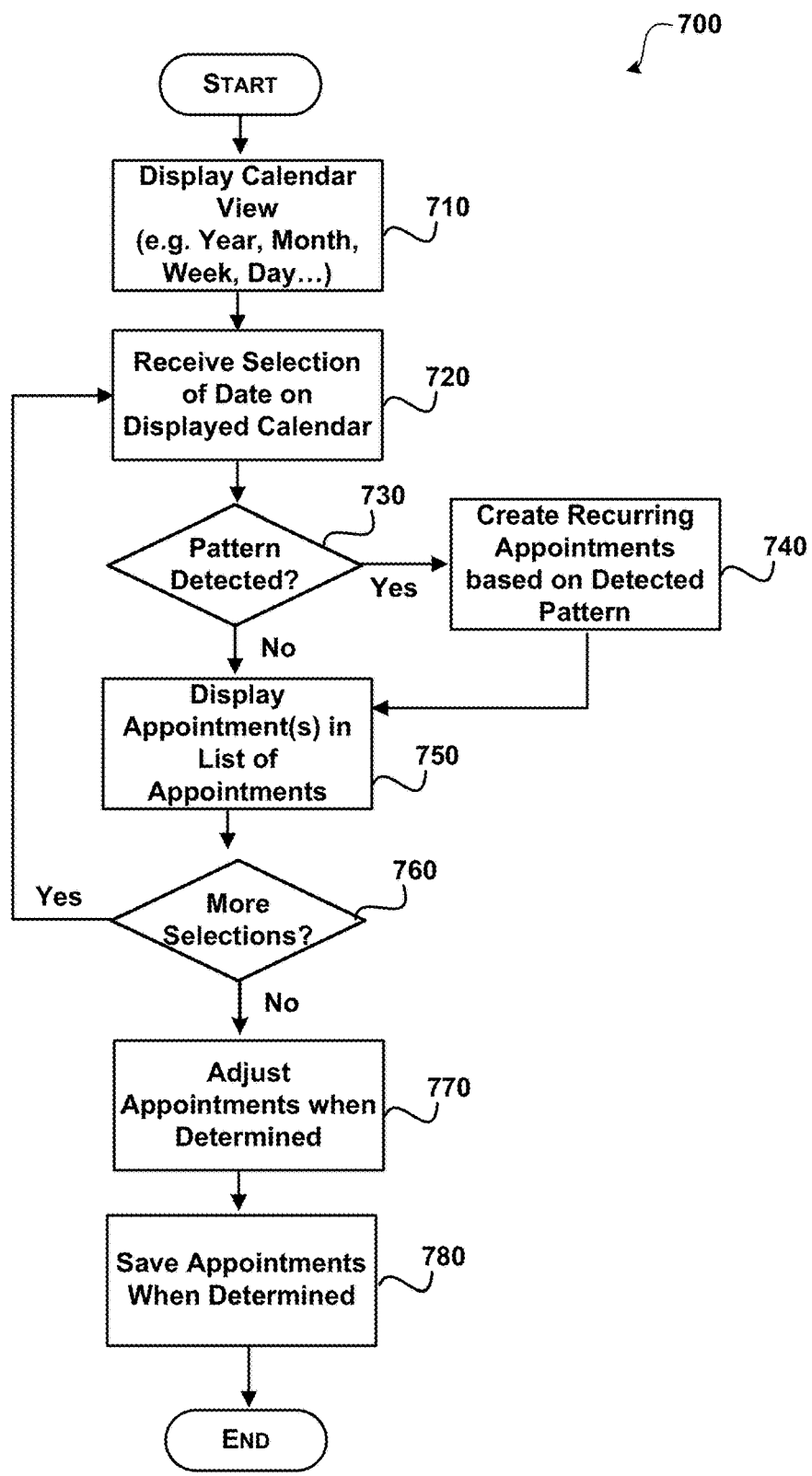
FIG. 7 shows a process for creating appointments by selecting dates on a displayed calendar.
Figure 8:
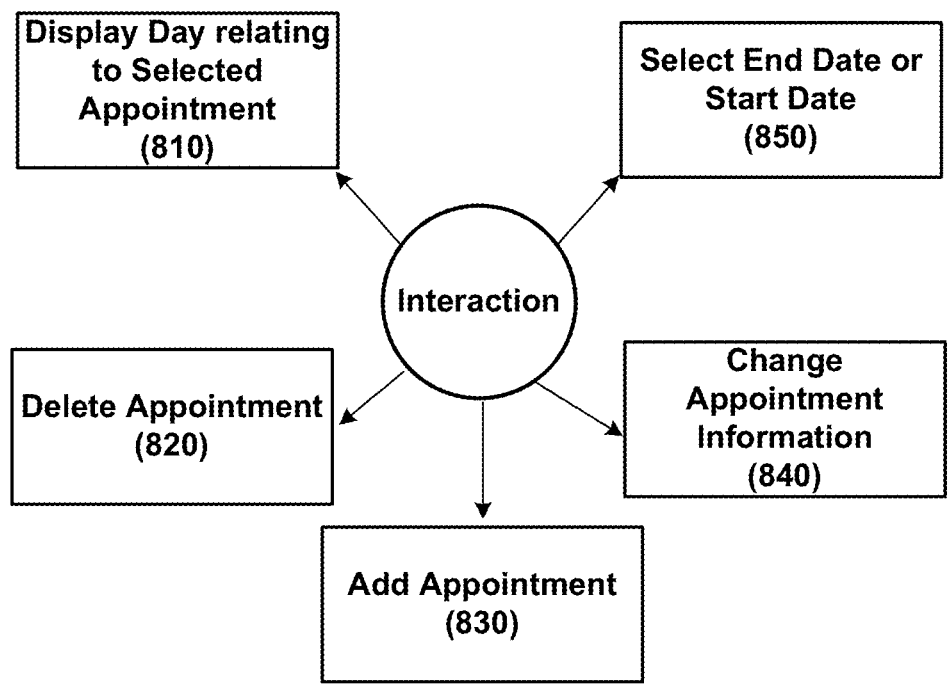
FIG. 8 shows receiving an interaction with an appointment.

FIGS. 7-8 illustrate creating appointments by selecting dates on a calendar. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 7 shows a process for creating appointments by selecting dates on a displayed calendar.

After a start operation, the process moves to operation 710, where a calendar view is displayed. The calendar view may be a daily view, a multi-day view, a weekly view, a monthly view, a yearly view, or some other time period.

Transitioning to operation 720, a user selects a date on the calendar to automatically create an appointment. For example, a user may touch the date on which they would like an appointment made. According to an embodiment, a user may point to a date that they would like selected or say the date that they would like selected.

Flowing to decision operation 730, a determination is made to determine whether a pattern has been detected from the appointments that are already selected. Different methods may be used to detect a pattern. According to an embodiment, at least two selections are received before attempting to detect a pattern. Other number of selections may be used (e.g. three, four, five, . . . ) before attempting to detect a pattern. When a pattern is detected, the process flows to operation 740. When a pattern is not detected the process flows to operation 750.

At operation 740, recurring appointments are automatically created based on the detected pattern. A start date and end date for the automatically created recurring appointments may be set by selecting dates on the calendar or specifying the dates using some other method (e.g. using an appointment user interface).

At operation 750, the selected appointment and/or the automatically created appointments may be displayed in an appointment user interface. According to an embodiment, each appointment that is displayed within the appointment user interface is individually selectable and editable. For example, the user may edit appointment information by selecting one of the displayed appointments from the list. The user may also delete dates from the appointment user interface without having to locate the appointment on the display of the calendar.

Transitioning to decision operation 760, a determination is made as to whether there are any more selections to receive from a user. The determination as to whether there are any more selections to receive from a user may be determined using different methods. For example, a user may exit the appointment selection mode by selecting an option or saying a command to exit the appointment selection mode. When there are more selections, the process returns to operation 720. When there are not any more selections, the process moves to operation 770.

At operation 770, the appointments that were manually selected and the appointments that were automatically created may be adjusted. For example, a user may delete an appointment, change a time of an appointment, or change other appointment information. According to an embodiment, a user may adjust an appointment from the appointment list and/or directly from the calendar.

Flowing to operation 780, the appointments are saved when determined. For example, a user may select an option to save the appointments.

The process flows to an end operation and returns to processing other actions.

FIG. 8 shows receiving an interaction with an appointment.

Operation 810 displays a day relating to a selected appointment. According to an embodiment, when a user selects an appointment from the appointment user interface, the user is navigated to a display of that day on the calendar. The day view may replace the calendar view currently being displayed or be displayed in a different window (e.g. on top of the existing calendar display or at some other location). The day view allows a user to see more information for a particular day as compared to a week view or a monthly view. According to another embodiment, the calendar view is scrolled such that the selected day is in focus but the calendar view (e.g. month view, week view, year view, etc.) is the same as it was before the user selected the appointment.

Operation 820 illustrates deleting an appointment. For example, a user may select an option on an appointment user interface to delete an appointment. The appointment that is deleted may be a manual created appointment or an automatically created appointment.

Operation 830 adds an appointment in response to an interaction. For example, a user may manually create another appointment or select another date on the calendar.

Operation 840 is used to change appointment information for a selected appointment. For example, a user may change the time, date, or other appointment information in response to the interaction.

A user may also select a start date or an end date (850) in response to an interaction. For example, a user may select a start date or an end date directly from the calendar, from a list of possible end dates, or by entering a start date or an end date in a user interface element.

Figure 9:
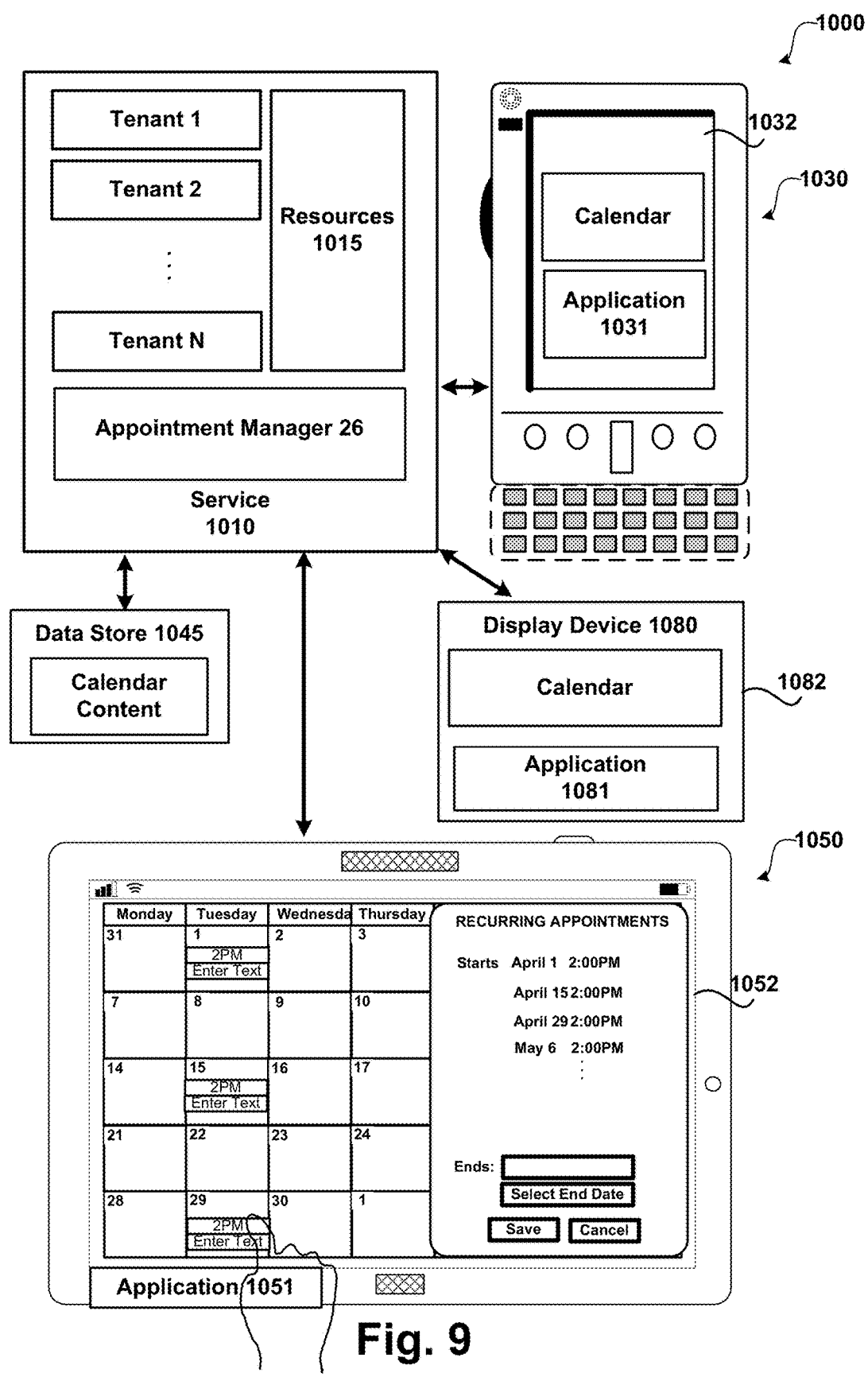
FIG. 9 illustrates an exemplary online system for automatically creating appointments.

FIG. 9 illustrates an exemplary online system for automatically creating appointments. As illustrated, system 1000 includes service 1010, data store 1045, touch screen input device 1050 (e.g. a tablet/slate), smart phone 1030 and display device 1080.

As illustrated, service 1010 is a cloud based and/or enterprise based service that may be configured to provide services, including services that create appointments (e.g. PIM services, productivity services and the like). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and display device 1080 are configured applications (1031, 1051, 1081) that create appointments in response to receiving selections of dates from a displayed calendar.

As illustrated, touch screen input device 1050, smart phone 1030, and display device 1080 shows exemplary displays 1052/1032/1082 showing the use of an application, such as a calendar application. Data may be stored on a device (e.g. smart phone 1030, slate 1050 and/or at some other location (e.g. network data store 1045). Data store 1045, or some other store, may be used to store calendar content including appointment information as well as other data. The applications used by the devices may be client based applications, server based applications, cloud based applications and/or some combination. According to an embodiment, display device 1080 is a device such as a MICROSOFT XBOX coupled to a display.

Appointment manager 26 is configured to perform operations relating to automatically creating appointments as described herein. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include keystroke entry, touch screen entry, voice or other audio entry, gesture entry where an associated computing device is equipped with detection (e.g., camera) functionality for capturing and interpreting user gestures for controlling the functionality of the computing device, and the like.

Figure 10:
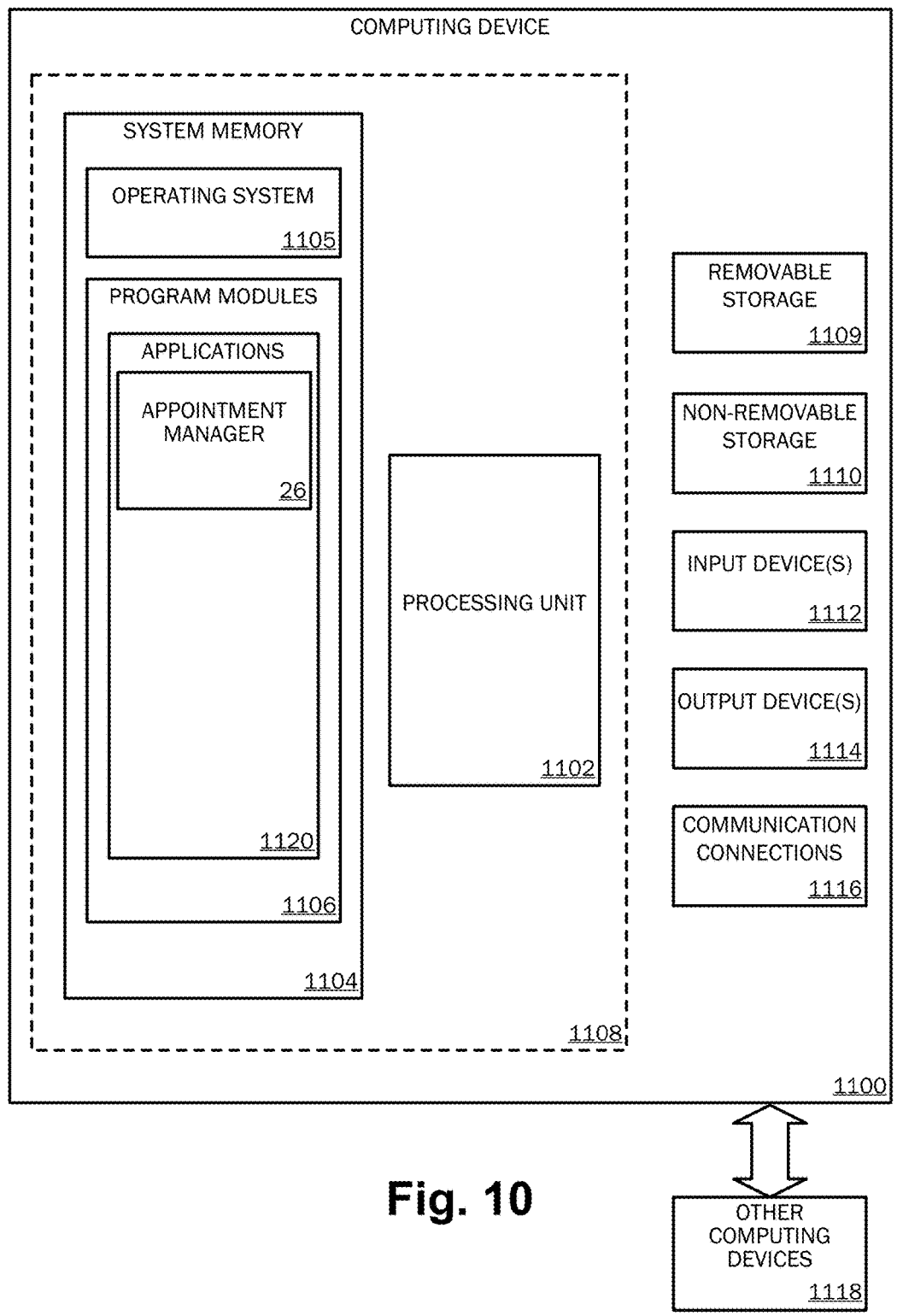
FIGS. 10, 11A, 11B and 12 and the associated descriptions provide a discussion of a variety of operating environments in which embodiments of the invention may be practiced.
Figure 11A:
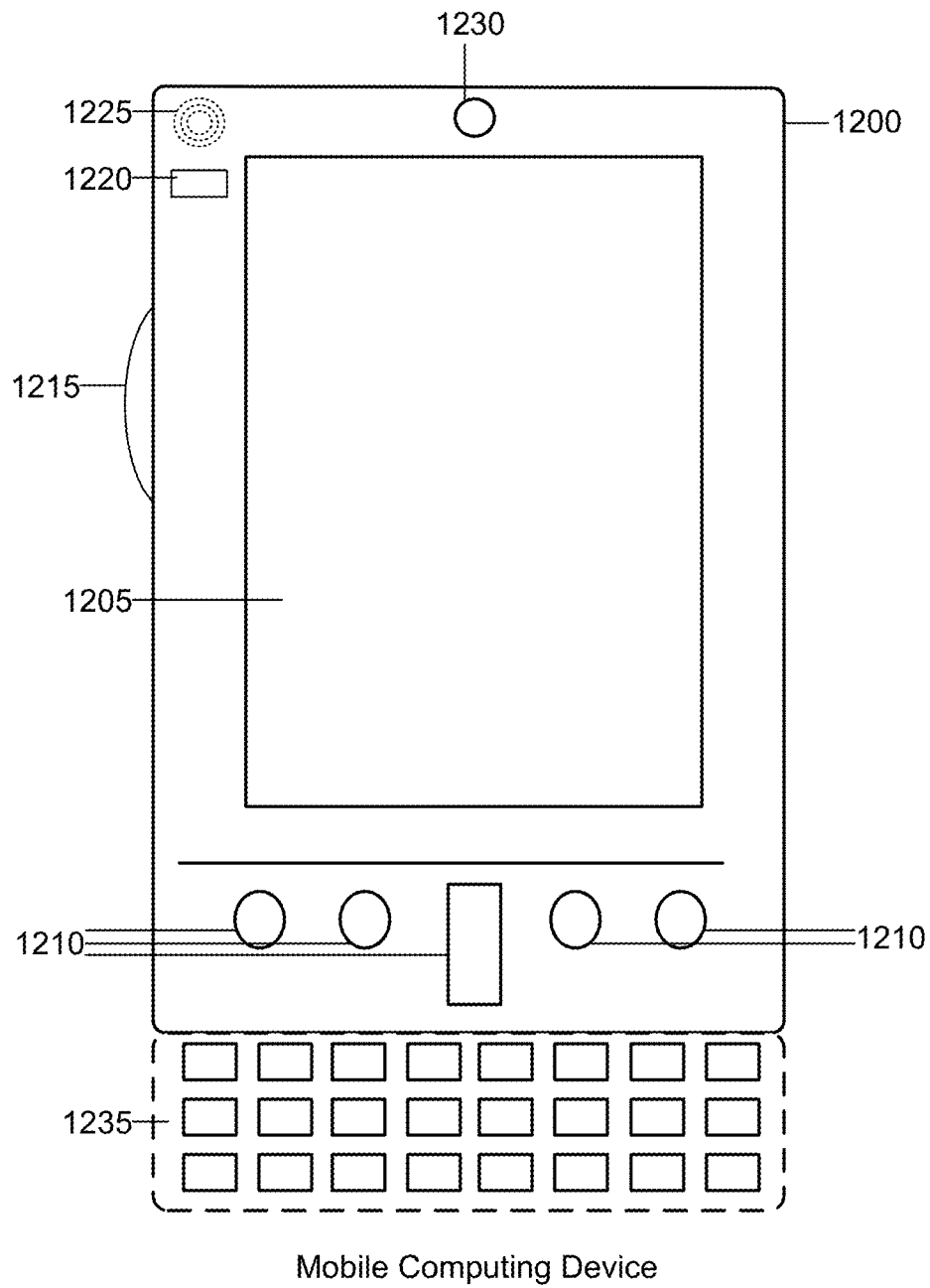
Figure 11B:
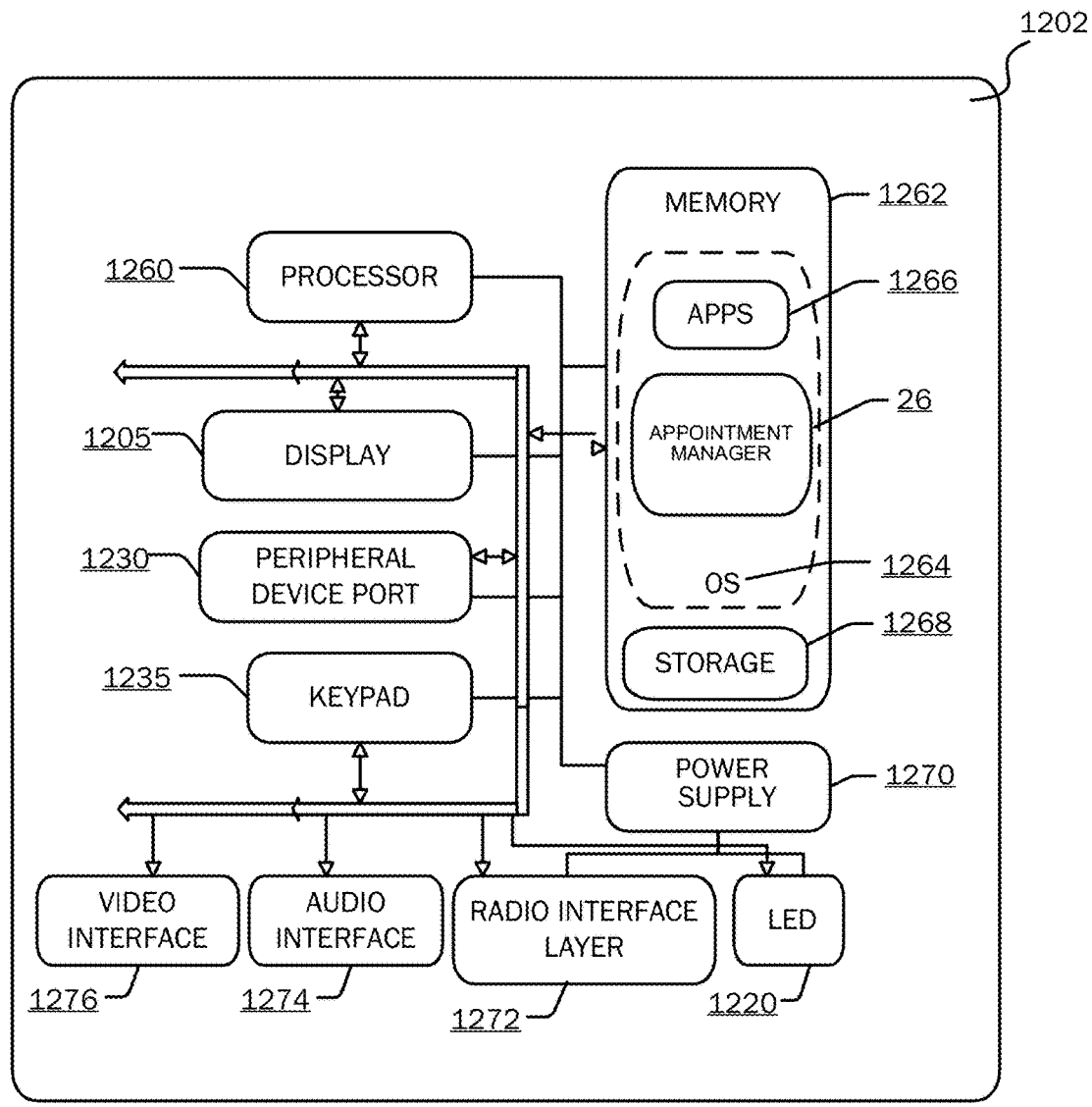
Figure 12:
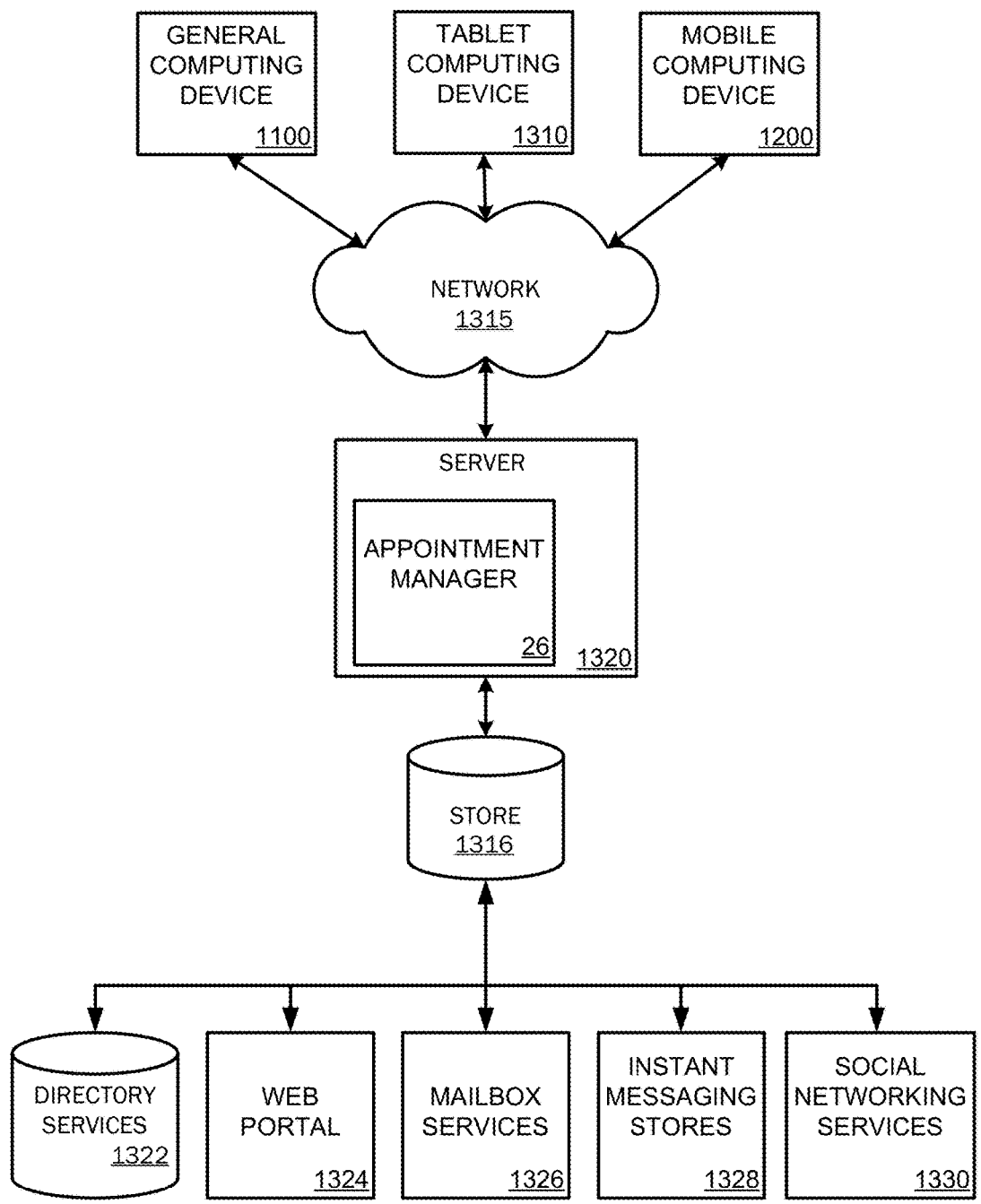

FIGS. 10-12 and the associated descriptions provide a discussion of a variety of operating environments in which embodiments of the invention may be practiced. However, the devices and systems illustrated and discussed with respect to FIGS. 10-12 are for purposes of example and illustration and are not limiting of a vast number of computing device configurations that may be utilized for practicing embodiments of the invention, described herein.

FIG. 10 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the appointment manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 10 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 10 by a removable storage device 1109 and a non-removable storage device 1110.

As stated above, a number of program modules and data files may be stored in the system memory 1104. While executing on the processing unit 1102, the program modules 1106 (e.g., the appointment manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the appointment manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1200, for example, a mobile telephone, a smart phone, a tablet personal computer, a laptop computer, and the like, with which embodiments of the invention may be practiced. With reference to FIG. 11A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the appointment manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 11B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 12 illustrates an embodiment of an architecture of an exemplary system, as described above. Content developed, interacted with, or edited in association with the appointment manager 26 may be stored in different communication channels or other storage types. For example, various documents may be stored using a directory service 1322, a web portal 1324, a mailbox service 1326, an instant messaging store 1328, or a social networking site 1330. The appointment manager 26 may use any of these types of systems or the like for enabling data utilization, as described herein. A server 1320 may provide the appointment manager 26 to clients. As one example, the server 1320 may be a web server providing the appointment manager 26 over the web. The server 1320 may provide the appointment manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for automatically creating recurring appointments, comprising:
   displaying, via graphical user interface, a calendar view;
   receiving selections of appointment dates directly from the calendar view;
   receiving selections of a start date and an end date directly from the calendar view;
   automatically creating appointments for the selected dates;
   automatically determining, without user input, a pattern from the selected appointment dates; and
   automatically creating, without user input, recurring appointments based on the pattern;
   wherein the pattern is determined from at least two dates among the selected appointment dates, and
   wherein the recurring appointments have the start date and the end date as selected.

2. The method of claim 1, wherein the pattern is determined by receiving a selection of a first date that corresponds to the same day of the week as a second date, the first date and the second date being selected in the selections of dates.

3. The method of claim 2, wherein determining the pattern from the dates selected on the calendar comprises receiving at least two date selections from the calendar.

4. The method of claim 1, further comprising displaying each of the appointments automatically created such that each of the appointments is individually selectable within an appointment user interface.

5. The method of claim 1, further comprising updating the calendar in response to a selection of one of the created appointments in an appointment user interface to display a day of the selected appointment.

6. The method of claim 1, further comprising removing an appointment from the calendar in response to receiving a delete instruction using an appointment user interface.

7. The method of claim 1, further comprising adding an appointment to the calendar in response to receiving an add appointment instruction using an appointment user interface.

8. The method of claim 1, further comprising receiving a change to appointment information for a selected appointment from an appointment user interface.

9. The method of claim 1, further comprising determining an end date for the created appointments using a selection of an end date from the calendar.

10. A computer-readable medium storing computer-executable instructions comprising:
   displaying, via a graphical user interface, a calendar view;
   receiving selections of appointment dates that are displayed on the calendar view;
   receiving selections of a start date and an end date that are displayed on the calendar view;
   automatically determining, without user input, that a pattern exists using the appointment dates selected on the calendar; and
   automatically creating appointments for the selected appointment dates, wherein the pattern is determined from at least two dates among the selected appointment dates; and
   automatically creating, without user input and based on the pattern, recurring other appointments,
   wherein the recurring other appointments have the start date and the end date as selected.

11. The computer-readable medium of claim 10, further comprising displaying each of the appointments automatically created such that each of the appointments is individually selectable within an appointment user interface.

12. The computer-readable medium of claim 10, further comprising updating the calendar in response to a selection of one of the created appointments in an appointment user interface to display a day of the selected appointment.

13. The computer-readable medium of claim 10, further comprising removing an appointment from the calendar in response to receiving a delete instruction using an appointment user interface.

14. The computer-readable medium of claim 10, further comprising adding an appointment to the calendar in response to receiving an add appointment instruction using an appointment user interface.

15. The computer-readable medium of claim 10, further comprising receiving a change to appointment information for a selected appointment from an appointment user interface.

16. A system for creating appointments, comprising:
   a processor and memory;
   an operating environment executing using the processor; and
   an appointment manager that is configured to perform actions compromising:
      displaying a calendar view;
      receiving selections of appointment dates that are displayed on the calendar view;
      receiving selections of a start date and an end date that are displayed on the calendar view;
      automatically determining, without user input, a pattern using the appointment dates selected on the calendar, wherein the pattern is determined from at least two dates among the selected appointment dates;
      automatically creating appointments for the selected appointment dates;
      automatically creating, without user input, other appointments using the pattern, wherein the created other appointments recur, and
      wherein the created other appointments have the start date and the end date as selected; and
      displaying the created appointments and the created other appointments in an appointment user interface.

17. The system of claim 16, further comprising removing an appointment from the calendar in response to receiving a delete instruction using the appointment user interface.

18. The system of claim 16, further comprising adding an appointment to the calendar in response to receiving an add appointment instruction using the appointment user interface.

19. The method of claim 1, wherein the at least two dates comprise a relationship between a first date that corresponds to the same day of the week as a second date.

20. The method of claim 1, wherein the at least two dates comprise a similar number of days between a first date, a second date, and a third date.

* * * * *